United States Patent [19]

Hua

[11] Patent Number: 5,560,250

[45] Date of Patent: Oct. 1, 1996

[54] VARIABLE SPEED MECHANISM

[76] Inventor: Jung-Lin Hua, 11th Fl., No. 1, Lane 1, Kuo Feng St.,, Tso Ying Dist. Kaohsiung, Taiwan

[21] Appl. No.: 399,743

[22] Filed: Mar. 7, 1995

[51] Int. Cl.[6] ........................................... F16H 3/08
[52] U.S. Cl. ........................... 74/371; 74/333; 74/372
[58] Field of Search .................. 74/325, 333, 341, 74/362, 366, 368, 370, 371, 372

[56] References Cited

U.S. PATENT DOCUMENTS

| | | | |
|---|---|---|---|
| 1,872,861 | 8/1932 | Wise | 74/372 |
| 2,698,545 | 1/1955 | Pethybridge | 74/371 |
| 3,354,739 | 11/1967 | Ivanchich | 74/372 |
| 3,889,547 | 6/1975 | Sun et al. | 74/372 X |
| 4,713,983 | 12/1987 | Rundle | 74/372 X |
| 5,400,671 | 3/1995 | Hall et al. | 74/371 X |

*Primary Examiner*—Charles A. Marmor
*Assistant Examiner*—Peter Kwon
*Attorney, Agent, or Firm*—Poms, Smith, Lande & Rose

[57] ABSTRACT

A variable speed mechanism includes a drive shaft, a plurality of drive gears each fixedly mounted around the drive shaft, a plurality of driven gears each respectively meshing with a corresponding one of the drive gears, a plurality of single direction needle bearings each fixedly mounted in a corresponding one of the plurality of driven gears, a driven shaft mounted in the plurality of single direction needle bearings, an elongated sleeve slidably mounted around the driven shaft, the elongated sleeve being slidable on the driven shaft between a first position where an enlarged free end thereof is fitted into a corresponding one of the single direction needle bearings such that the elongated sleeve is rotated by the associated driven gear, thereby rotating the driven shaft therewith, and a second position where the enlarged free end thereof is not in contact with any one of the single direction needle bearings such that the elongated sleeve and the driven gear stop rotating, a rack slidably mounted in parallel with the elongated sleeve and including a cross arm formed on a distal end thereof and pivotally engaged with one free end of the elongated sleeve, and an actuating gear capable of moving the rack whose cross arm in turn drives the elongated sleeve to slide on the driven shaft.

5 Claims, 4 Drawing Sheets

5,560,250

VARIABLE SPEED MECHANISM

BACKGROUND OF THE INVENTION

1. Field of Invention

The present invention relates to a variable speed mechanism, and more particularly to a variable speed mechanism for an automobile and the like comprising such an mechanism.

2. Related Prior Art

A conventional variable speed mechanism for an automobile is complex in construction with a great deal of mechanical operating procedures and is not able to be applied to other types of mechanical equipment such as drilling tools.

The present invention has arisen to mitigate and/or obviate the disadvantages of the conventional variable speed mechanism.

SUMMARY OF THE INVENTION

The primary objective of the present invention is to provide a variable speed mechanism for an automobile.

In accordance with one aspect of the present invention, there is provided a variable speed mechanism for cooperating with an electric motor and comprising a drive shaft driven by the electric motor. A plurality of drive gears each are fixedly mounted around the drive shaft to rotate therewith, a plurality of driven gears each respectively mesh with a corresponding one of the drive gears, and a plurality of single direction needle bearings each are fixedly mounted in a corresponding one of the plurality of driven gears. A driven shaft is mounted in the plurality of single direction needle bearings and includes a first distal end and a second distal end. An elongated sleeve is slidably mounted around the driven shaft and includes a first free end and a second free end with an enlarged diameter.

The elongated sleeve is slidable on the driven shaft between a first position where the second free end thereof is fitted into a corresponding one of the single direction needle bearings such that the elongated sleeve is rotated by the associated driven gear, thereby rotating the driven shaft therewith, and a second position where the second free end thereof is not in contact with any one of the single direction needle bearings such that the elongated sleeve and the driven gear stop rotating. A rack is slidably mounted in parallel with the elongated sleeve and includes a cross arm formed on a distal end thereof and pivotally engaged with the first free end of the elongated sleeve. An actuating gear meshes with the rack and is driven to rotate by a servomotor so as to move the rack whose cross arm in turn drives the elongated sleeve to slide on the driven shaft.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENTS

Figure 1:
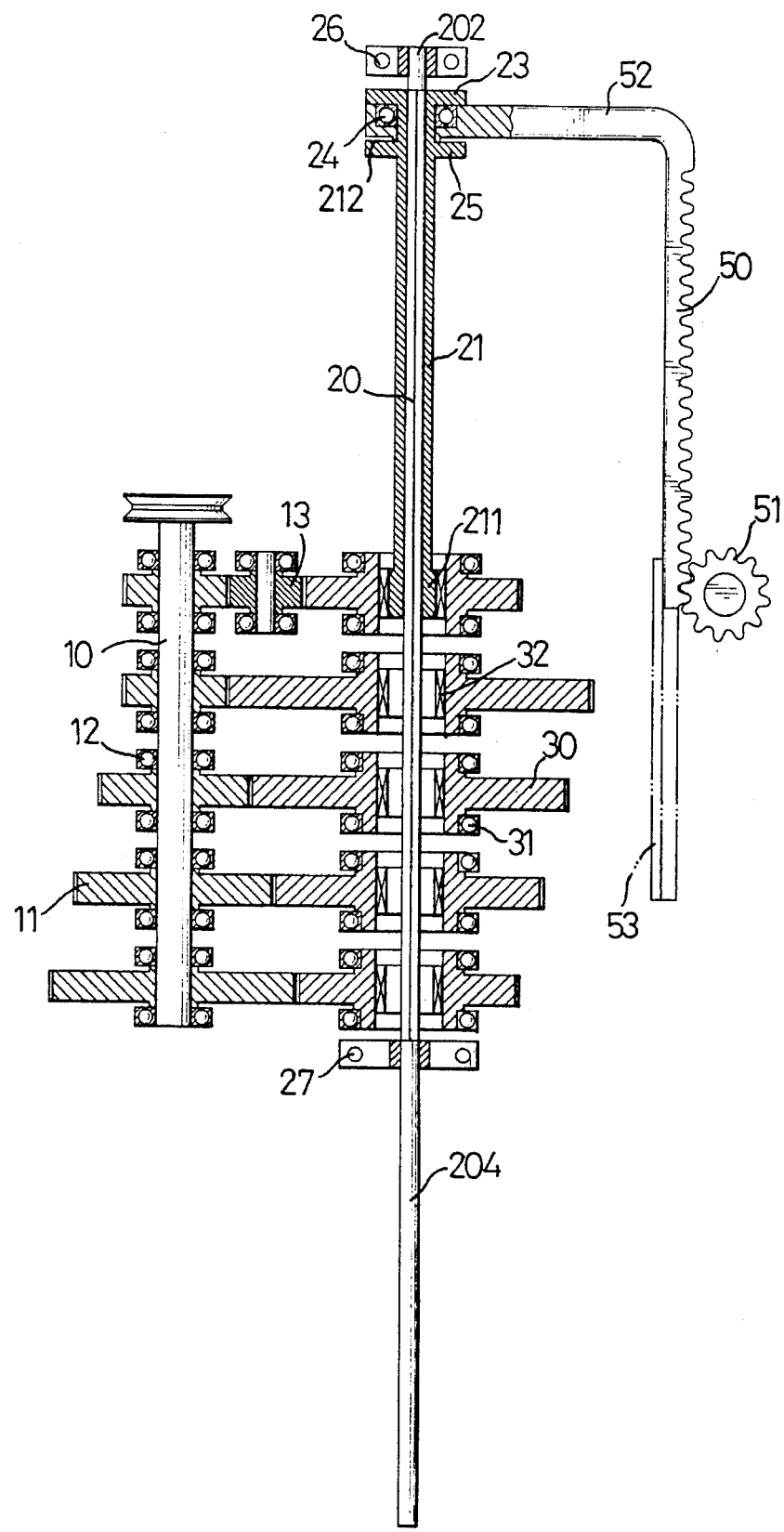
FIG. 1 is a front plan cross-sectional view of a variable speed mechanism in accordance with the present invention.

Referring to the drawings and initially to FIG. 1, a variable speed mechanism for an automobile in accordance with the present invention is provided for co-operating with an electric motor and comprises a drive shaft 10 driven by the electric motor (not shown). A plurality e.g., 5, of drive gears 11 each are fixedly mounted around the drive shaft 10 to rotate therewith, five driven gears 30 each respectively mesh with a corresponding one of the drive gears 11, and five single direction needle bearings 32 each are fixedly mounted in a corresponding one of the five driven gears 30. A driven shaft 20 is mounted in the five single direction needle bearings 32 and includes a first distal end 202 and a second distal end 204. It is to be noted that the number of the drive gears 11 and the driven gears 30 is not limited to 5 and may be arbitrarily increased or decreased as required.

An elongated sleeve 21 is slidably mounted around the driven shaft 20 and includes a first free end 212 and a second free end 211 with an enlarged diameter. The elongated sleeve 21 is slidable on the driven shaft 20 between a first position where the second free end 211 thereof is fitted into a corresponding one of the single direction needle bearings 32 such that the elongated sleeve 21 is rotated by the associated driven gear 30, thereby rotating the driven shaft 20 therewith, and a second position where the second free end 211 thereof is not in contact with any one of the single direction needle bearings 32 such that the elongated sleeve 21 and the driven gear. 30 stop rotating, i.e., the driven gear 30 idles.

A rack 50 is slidably mounted in parallel with the elongated sleeve 21 and includes a cross arm 52 formed on a distal end thereof and pivotally engaged with the first free end 212 of the elongated sleeve 21. An actuating gear 51 meshes with the rack 50 and is driven to rotate by a servomotor (not shown) so as to move the rack 50 whose cross arm 52 in turn drives the elongated sleeve 21 to slide on the driven shaft 20.

Preferably, the driven shaft 20 has a hexagonal or tetragonal configuration and the first and second ends 202 and 204 thereof have a circular configuration. Correspondingly, the elongated sleeve 21 includes an inner portion of a hexagonal or tetragonal configuration so as to match the driven shaft 20 and an outer portion of a circular configuration. In addition, the rack 50 is slidably moved along a guiding track 53 which is mounted in parallel with the elongated sleeve 21. A first stopping plate 23 and a second stopping plate 25 are respectively mounted on the first free end of the elongated sleeve 21, the cross arm 52 of the rack 50 is pivotally engaged between the first and second stopping plates 23 and 25, and a ball bearing 24 is rotatably mounted between the first and second stopping plate 23 and 25 of the elongated sleeve 21 and the cross arm 52 of the rack 50.

Further, five ball bearings 12 are respectively and rotatably mounted between the five drive gears 11 and the drive shaft 10 and five ball bearings 31 are respectively and rotatably mounted between the five driven gears 30 and the driven shaft 20. Further ball bearings 26 and 27 are respectively and rotatably mounted around the first and second distal ends 202 and 204 of the driven shaft 20. It is appreciated that a transmission gear 13 is provided for meshing between a corresponding one of the drive gears 11 and the associated driven gear 30 and the single direction needle bearing 32 is integrally formed on the associated driven gear 30.

Figure 2:
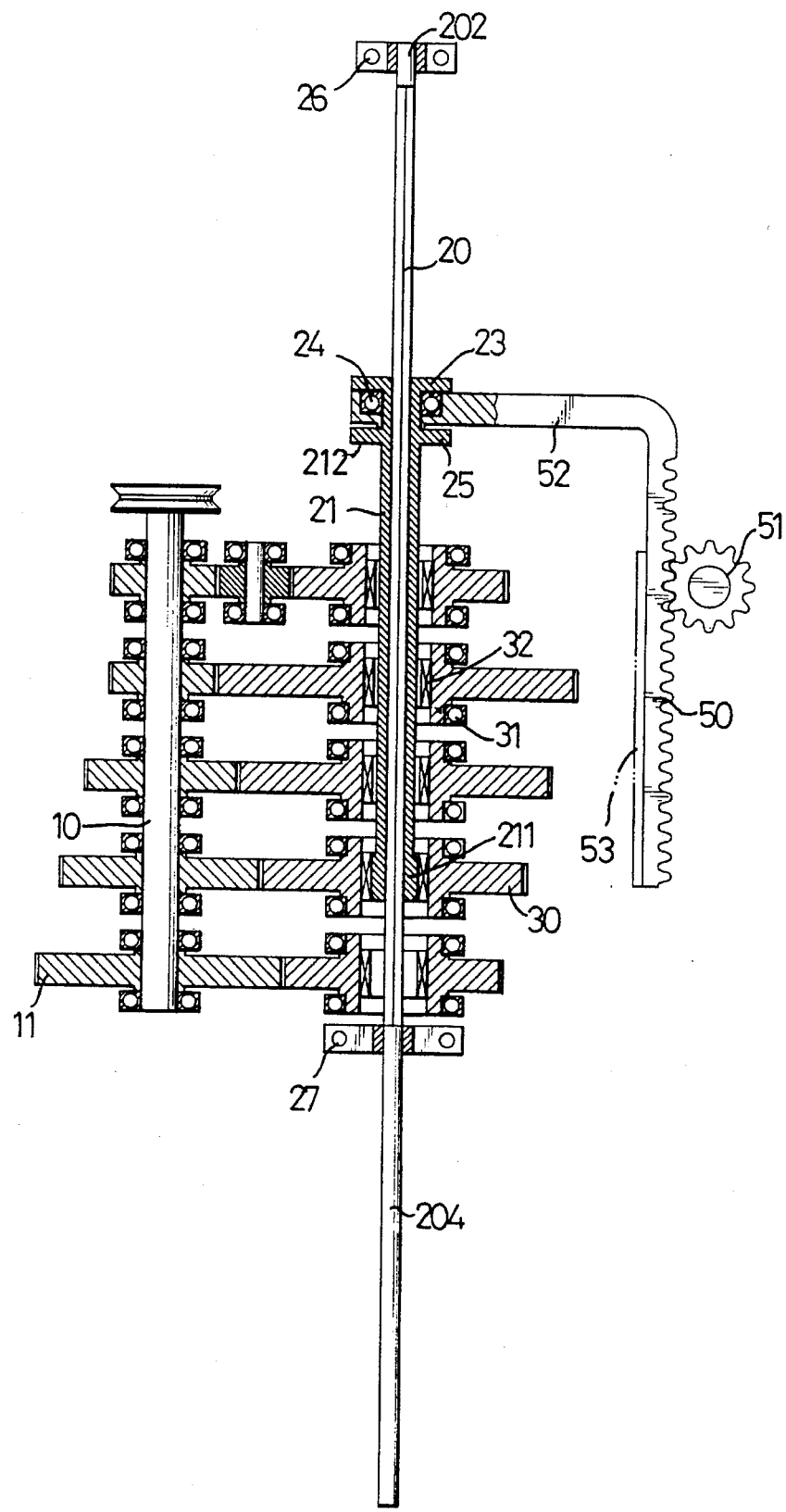
FIG. 2 is a front plan cross-sectional view as shown in FIG. 1 wherein an elongated sleeve is in a different position.
Figure 3:
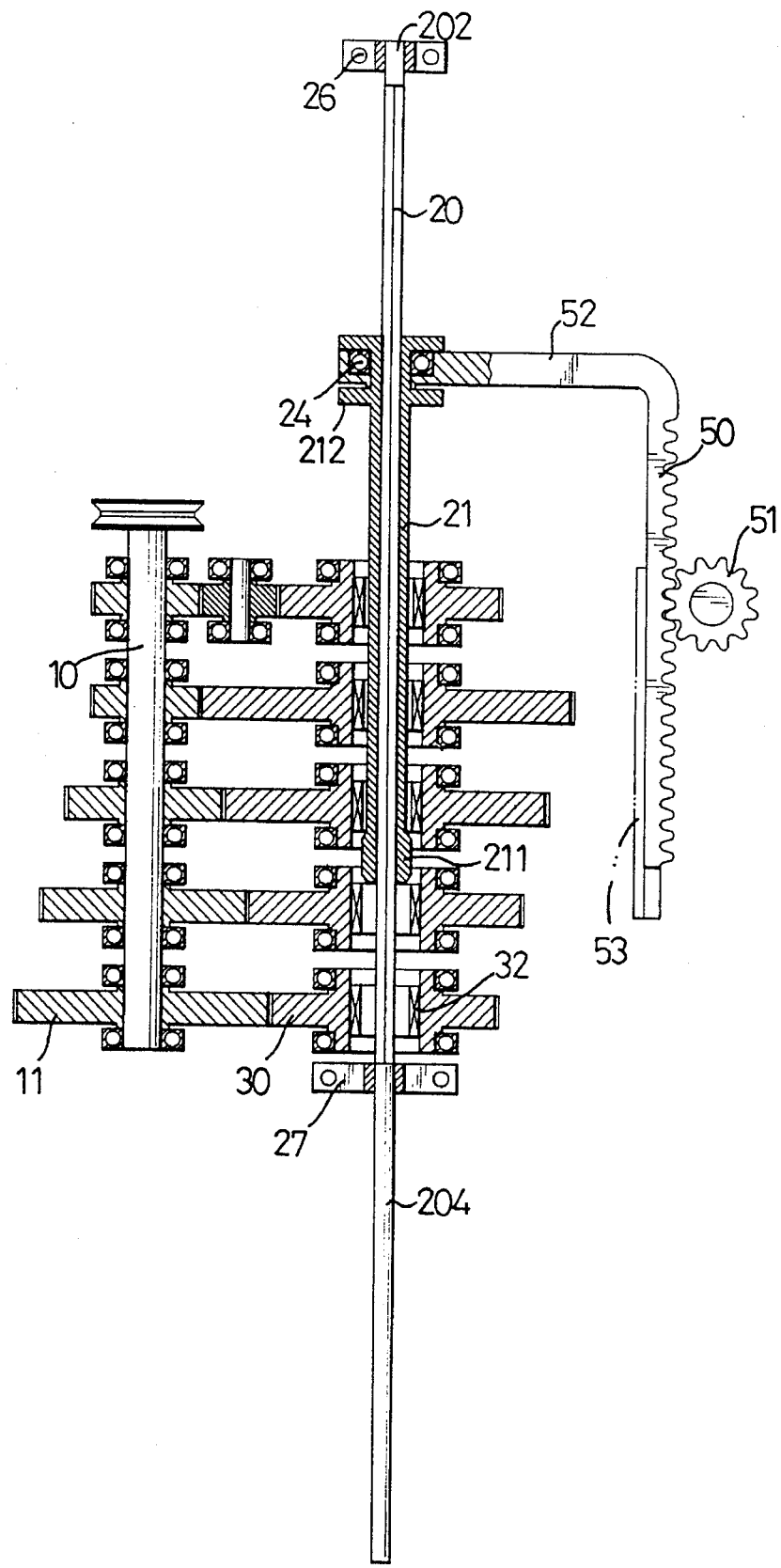
FIG. 3 is a front plan cross-sectional view as shown in FIG. 1 wherein the elongated sleeve is in another different position.

In operation, referring to FIGS. 1–4, the drive shaft 10 is driven by the electric motor to rotate the drive gears 11 therewith, thereby rotating the driven gears 30 and the associated single direction needle bearings 32 to rotate in an opposite direction therewith. When the enlarged free end 211 of the elongated sleeve 21 in not in contact with any one of the single direction needle bearings 32 as shown in FIG. 3, the elongated sleeve 21 is not rotated by the driven gear 30, i.e., the driven gear 30 performs an idle rotation. When the enlarged free end 211 of the elongated sleeve 21 is moved by means of the cross arm 52 of the rack 50 to be fitted into one of the single direction needle bearings 32 as shown in FIGS. 1 and 2, the elongated sleeve 21 is synchronously rotated by the associated driven gear 30, thereby rotating the driven shaft 20 therewith.

Figure 4:
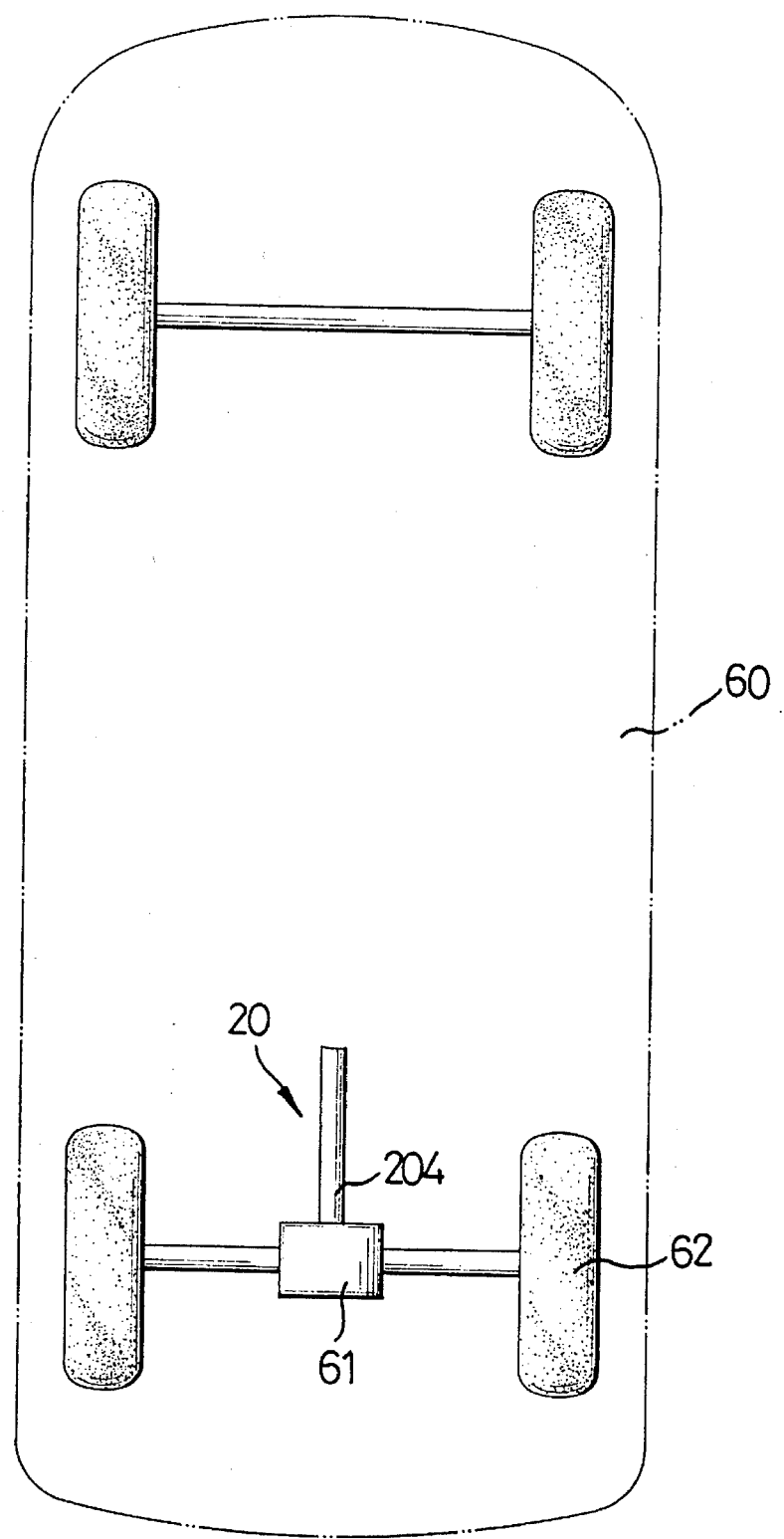
FIG. 4 is an assembly view of the variable speed mechanism co-operating with parts of an automobile.

Referring to FIG. 4, the second distal end 204 of the driven shaft 20 is directly coupled to a differential 61 which is connected to wheels 62 of an automobile 60. By such an arrangement, the rotational power is outputted from the second distal end 204 to drive the wheels 62 to rotate via the differential 61, thereby moving the automobile 60. When the enlarged free end 211 of the elongated sleeve 21 is moved from a position as shown in FIG. 1 to a position as shown in FIG. 2, the rotational rate of speed of the driven shaft 20 is different so as to change the rotational rate of speed of the wheels 62, thereby being capable of varying the traveling speed of the automobile 60.

It is to be noted that, when the electric motor stops operation, the drive and driven gears 11 and 30 also stop rotation while the wheels 62 still rotate due to inertia action, the enlarged free end 211 of the elongated sleeve 21 is able to move from the position as shown in FIG. 1 to the position as shown in FIG. 2 so as to obtain a different rotational speed of the driven shaft 20, thereby changing the traveling speed of the automobile 60.

It should be clear to those skilled in the art that further embodiments of the present invention may be made without departing from the teachings of the present invention.

I claim:

1. A variable speed mechanism for co-operating with an electric motor and comprising:

a drive shaft adapted to be driven by said electric motor;

a plurality of drive gears each fixedly mounted around said drive shaft to rotate therewith;

a plurality of driven gears each respectively meshing with a corresponding one of said plurality of drive gears;

a plurality of single direction needle bearings each fixedly mounted in a corresponding one of said plurality of driven gears;

a driven shaft mounted in said plurality of single direction needle bearings and including a first distal end and a second distal end;

an elongated sleeve slidably mounted around said driven shaft and including a first free end and a second free end with an enlarged diameter, said elongated sleeve being slidable on said driven shaft between a first position where said second free end of said elongated sleeve is fitted into a corresponding one of said plurality of single direction needle bearings while said elongated sleeve is rotated by an associated driven gear, thereby rotating said driven shaft therewith, and a second position where said second free end of said elongated sleeve is not in contact with any one of said plurality of single direction needle bearings while said elongated sleeve together with said driven gear stop rotating;

a rack slidably mounted in parallel with said elongated sleeve and including a cross arm formed on a distal end thereof and pivotally engaged with the first free end of said elongated sleeve; and an actuating gear meshing with said rack and adapted to be rotated by means of a servomotor so as to move said rack whose cross arm in turn drives said elongated sleeve to slide on said driven shaft.

2. The variable speed mechanism in accordance with claim 1, wherein said rack is slidably moved along a guiding track which is mounted in parallel with said elongated sleeve.

3. The variable speed mechanism in accordance with claim 1, further comprising a ball bearing rotatably mounted between said first free end of said elongated sleeve and said cross arm of said rack.

4. The variable speed mechanism in accordance with claim 1, further comprising a transmission gear meshing between a corresponding one of said plurality of drive gears and an associated driven gear.

5. The variable speed mechanism in accordance with claim 1, wherein said single direction needle bearing is integrally formed on the associated said driven gear.

* * * * *